(12) United States Patent
Doong et al.

(10) Patent No.: US 7,924,743 B2
(45) Date of Patent: Apr. 12, 2011

(54) METHOD FOR MULTICAST DISTRIBUTION TREE SWITCHOVER

(75) Inventors: Janet Doong, Chelmsford, MA (US); Arun Kudur, Arlington, MA (US); Harish Sankaran, Billerica, MA (US)

(73) Assignee: Avaya Holdings Limited, Basking Ridge, NJ (US)

( * ) Notice: Subject to any disclaimer, the term of this patent is extended or adjusted under 35 U.S.C. 154(b) by 390 days.

(21) Appl. No.: 11/549,708

(22) Filed: Oct. 16, 2006

(65) Prior Publication Data

US 2008/0089234 A1 Apr. 17, 2008

(51) Int. Cl.
*H04L 12/28* (2006.01)
*H04B 7/00* (2006.01)
*H04H 20/71* (2008.01)

(52) U.S. Cl. ...................................... 370/254

(58) Field of Classification Search .................. 370/235, 370/236, 408, 238, 254, 355, 310, 312, 389, 370/390, 392, 395.3, 395.31
See application file for complete search history.

(56) References Cited

U.S. PATENT DOCUMENTS

| | | | | |
|---|---|---|---|---|
| 6,714,559 B1 * | 3/2004 | Meier | | 370/449 |
| 7,120,733 B1 * | 10/2006 | Mick et al. | | 711/108 |
| 7,453,807 B2 * | 11/2008 | Sanchez et al. | | 370/235 |
| 2002/0150094 A1 * | 10/2002 | Cheng et al. | | 370/389 |
| 2006/0072532 A1 | 4/2006 | Dorenbosch et al. | | |
| 2006/0133375 A1 * | 6/2006 | Napierala | | 370/390 |

OTHER PUBLICATIONS

Estrin, D. et al.; "Protocol Independent Multicast-Sparse Mode (PIM-SM): Protocol Specification"; RFC 2362; Jun. 1998; 66 pages.

\* cited by examiner

*Primary Examiner* — Chirag G Shah
*Assistant Examiner* — Jenkey Van
(74) *Attorney, Agent, or Firm* — Chapin IP Law, LLC; David W. Rouille, Esq

(57) ABSTRACT

Described are a method and a device for efficiently switching multicast data flows from a shared distribution tree to a shortest path distribution tree. The method achieves an efficient and scalable tree switch that reduces the latency of multicast data transmitted from the source to receivers. A determination is made for each source group (S,G) entry in a portion of a forwarding plane database of a router as to whether a byte count for that entry exceeds a threshold value. A message sent from the forwarding plane to the router control plane indicates the (S,G) entries determined to have byte counts exceeding the respective threshold values. For each message entry, the respective shared distribution tree is switched to a shortest path distribution tree. The method achieves a substantial reduction in the number of inter-process messages exchanged between the control plane and the forwarding plane compared to conventional tree switchover techniques.

19 Claims, 3 Drawing Sheets

METHOD FOR MULTICAST DISTRIBUTION TREE SWITCHOVER

FIELD OF THE INVENTION

The present invention relates generally to the transmission of multicast data. More particularly, the invention relates to a method for switching a multicast data flow from a shared distribution tree to a shortest path distribution tree in a multi-process environment.

BACKGROUND OF THE INVENTION

Numerous Internet applications require sending data in a one-to-many or a many-to-may user environment. Examples of applications that use multicasting are transmitting an e-mail message to multiple recipients, transmitting stock quotes to brokers, replicating databases, teleconferencing and videoconferencing. Internet Protocol (IP) multicast routing permits the transmission of data packets between a finite set of nodes which are members of a multicast group. Multicasting allows a source node to transmit a packet of multicast information (herein referred to as a "multicast packet") simultaneously to all nodes in the multicast group using a single multicast address. Multicasting achieves an efficient transmission of data packets by enabling a source to send a single message to multiple designated recipients. Multicasting avoids bandwidth problems which result from point-to-point unicast data flows for similar applications. In addition, multicasting is more efficient than broadcasting data as the latter technique results in many uninterested nodes receiving the broadcast data.

FIG. 1 is a schematic diagram of a network environment 10 in which a multicast data flow is routed according to a shared tree distribution. The network environment includes a sender 14, a receiver 18, and a plurality of multicast routers 22, including a first-hop router 22A, a rendezvous point (RP) router 22B, and a designated router 22C. The shared tree is rooted at the RP router 22B. Although only three multicast routers 22 are illustrated, an intervening network 26 (e.g., Internet) can include one or more additional routers 22 to route the multicast data.

Multicast data from the sender 14 is transmitted to a plurality of receivers in a receiver group that includes the receiver 18. As illustrated, the multicast data flow from the sender 14 to the receiver 18 through the RP router 22B even though this path is not necessarily the shortest path. In response to one or more configuration parameters, the designated router 22C can initiate a switch to a shortest path (or "source-rooted") distribution tree by sending JOIN messages towards the sender 14. For example, the distribution tree "switchover" can be initiated if the multicast traffic for a source group (S,G) exceeds a certain data rate threshold value. Therefore, the time required to change from the shared distribution tree to the shortest path distribution tree is determined by the operation of the designated router 22C. This time includes the time necessary to detect that the threshold is exceeded and the time required to perform the switchover. After the distribution tree switchover is initiated, the multicast data flow according to the shortest path between the sender 14 and the receiver 18 as illustrated in FIG. 2.

For many users reducing the latency in a multicast data flow is important. In many instances, the time required to switch from a shared tree to a shortest path tree is also critical. In particular, applications such as internet protocol television (IPTV) and stock quote feeds require low latency.

What is needed is a method to reduce the delay of multicast flow from a shared distribution tree to a shortest path distribution tree. The present invention satisfies this need and provides additional advantages.

SUMMARY OF THE INVENTION

In one aspect, the invention features a method for transmitting multicast data through a network. The method includes providing a plurality of shared distribution trees in the network to route multicast data packets. For each entry in a plurality of source group (S,G) entries in a database of a forwarding plane of a router in the shared distribution tree, a determination is made as to whether a byte count for the (S,G) entry exceeds a threshold value. A message is sent from the forwarding plane to a control plane of the router indicating the (S,G) entries that are determined to have byte counts that exceed the respective threshold values. For each of the (S,G) entries in the message, the respective shared distribution tree is switched to a shortest path distribution tree.

In another aspect, the invention features a computer program product for initiating a distribution tree switchover for multicast data packets. The computer program product includes a computer useable medium having program code for providing a plurality of shared distribution trees in the network to route multicast data packets. The computer useable medium also has program code for determining whether, for each entry in a plurality of source group (S,G) entries in a database of a forwarding plane of a router in the shared distribution tree, a byte count exceeds a threshold value. The computer useable medium further includes program code for sending a message from the forwarding plane to a control plane of the router indicating the (S,G) entries that are determined to have byte counts that exceed the respective threshold values and program code for switching from a respective one of the shared distribution trees to a shortest path distribution tree for each of the (S,G) entries in the message.

In still another aspect, the invention features a device for routing multicast data packets through a network. The device includes a forwarding plane and a control plane. The forwarding plane includes a multicast forwarding database to store a plurality of source group (S,G) entries and to receive the multicast data packets. The forwarding plane also includes a plurality of byte counters. Each byte counter determines a byte count for an (S,G) entry for a time interval. The control plane is in communication with the forwarding plane and is adapted to receive a message from the forwarding plane indicating the (S,G) entries for which the byte count exceeds a respective threshold value. The control plane initiates a tree distribution switchover for each of the (S,G) entries in the message.

BRIEF DESCRIPTION OF THE DRAWINGS

The above and further advantages of this invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the principles of the invention.

DETAILED DESCRIPTION

In brief overview, the invention relates to a method and a device for efficiently switching a multicast data flow from a shared distribution tree to a shortest path distribution tree in a multi-process environment. For each forwarding entry in a router, a byte counter determines the number of bytes per time interval. If the "byte count" equals or exceeds a threshold value, the multicast data flow is switched to the shortest path distribution tree. The threshold value can be programmed to different values for each of the forwarding entries. Advantageously, the "switchover" method of the invention achieves a substantial reduction in the number of inter-process messages exchanged between the control plane and the forwarding plane of the router when compared with prior techniques for implementing a distribution tree switchover.

Figure 3:
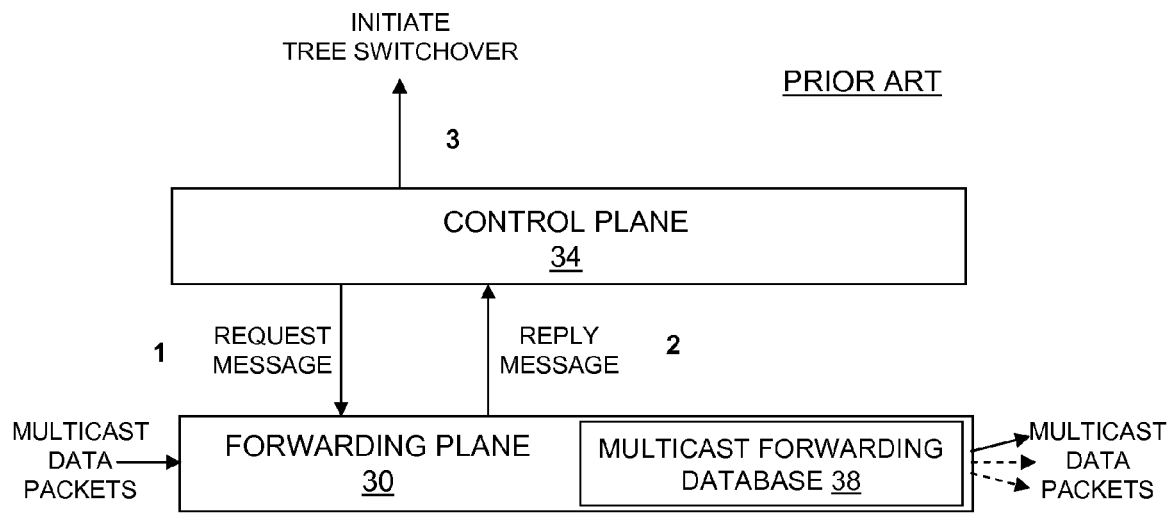
FIG. 3 is a block diagram illustrating the interaction between a forwarding plane and a control plane of a router used to route multicast data through a network.

FIG. 3 illustrates a forwarding plane (or data plane) 30 and a control plane 34 of a router used to route multicast data through a network as is known in the art. The forwarding plane 30 receives a data packet and forwards the data packet according to a matching source group (S,G) entry in the multicast forwarding database 38. The control plane 34 is configured to insert new route information into the forwarding database 38 as the new information is determined over time. A byte count is determined for each of the (S,G) entries in the forwarding database 38. The byte count generally comprises the number of bytes accumulated for an (S,G) entry for a certain time interval, i.e., a bytes per second value.

Various methods as are known in the art are used to implement a distribution tree switchover. In one known method, the control plane 34 sends a periodic request message for a byte count for a specific (S,G) entry to the forwarding plane 30. Generally, a request message is sent 1 for each (S,G) entry on a periodic basis. For each request message, a reply message indicating the number of bytes per second for the (S,G) entry is sent 2 from the forwarding plane 30 to the control plane 34. The control plane 34 then determines whether the byte count exceeds a threshold value configured for that (S,G) entry and initiates 3 a tree distribution switchover, if appropriate. This method does not scale well to increasing numbers of (S,G) entries in the forwarding database due to its inefficient use of messaging between the forwarding plane 30 and the control plane 34. As an example, if the control plane 34 polls the forwarding plane 30 with 70,000 request messages to inquire about all (S,G) entries in the multicast forwarding database 38, 70,000 reply messages are sent from the forwarding plane 30 to the control plane 34. Thus a total of 140,000 messages are exchanged between the control plane 34 and the forwarding plane 30.

In another prior method, the control plane 34 polls the forwarding plane 30 for a number N of (S,G) entries using a single request message. The number N may be determined according to the size of a buffer in the forwarding plane 30. In this example, it is again assumed that 70,000 (S,G) entries exist in the multicast forwarding database. If the number N is 250, the number of request messages required to poll for all (S,G) entries is 280 and the number of reply messages required is also 280. Thus a total of 560 messages are exchanged between the control plane 34 and the forwarding plane 30 to retrieve the byte count data to allow the control plane 34 to determine which (S,G) entries exceed their threshold values. In a variation of this method, a timer in the control plane 34 initiates a single message to be sent to the forwarding plane 30, requesting the byte counts for all of the (S,G) entries. In response, the forwarding plane 30 packs the requested information into reply messages. Assuming that the maximum number of byte count values that can be packed into a reply message is 250, the total number of reply messages is 280 and the total number of messages exchanged between the control plane 34 and the forwarding plane 30 is 281.

Figure 4:
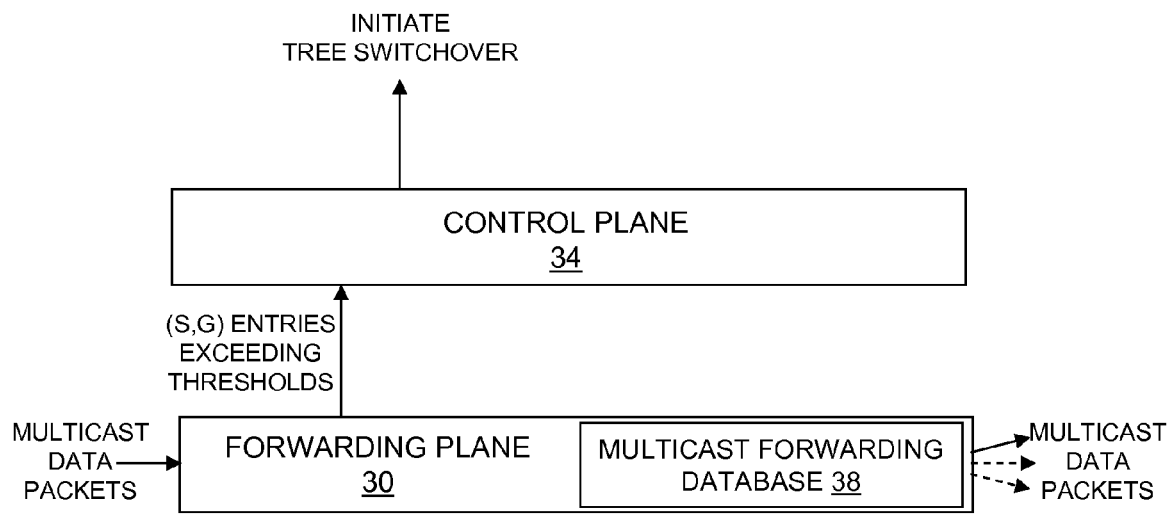
FIG. 4 is a block diagram illustrating the interaction between a forwarding plane and a control plane of a router used to route multicast data through a network according to an embodiment of the invention.

According to the method of the invention and in contrast to conventional methods for implementing a distribution tree switchover, the control plane 34 does not poll the forwarding plane 30 to determine the byte counts. Instead, a determination is made in the forwarding plane 30 as to which (S,G) entries within a portion of the multicast forwarding database 38 have byte counts that exceed their threshold values. The examined byte counters are then reset to zero. As shown in FIG. 4, the forwarding plane 30 then sends a message to the control plane 34 indicating the (S,G) entries in that portion of the forwarding database 38 which have byte counts that exceed their configured threshold values. Multiple messages are sent if the (S,G) entries with excess byte counts cannot be packed into a single message. Database markers are used to designate the next portion of the forwarding database 38 to examine for byte counts. Thus the entire multicast forwarding database 38 is examined one portion at a time.

Advantageously, the method of the invention results in a substantial reduction in the number of messages exchanged between the control plane 34 and the forwarding plane 30. CPU time is reduced and the distribution tree switchover occurs in less time.

Figure 1:
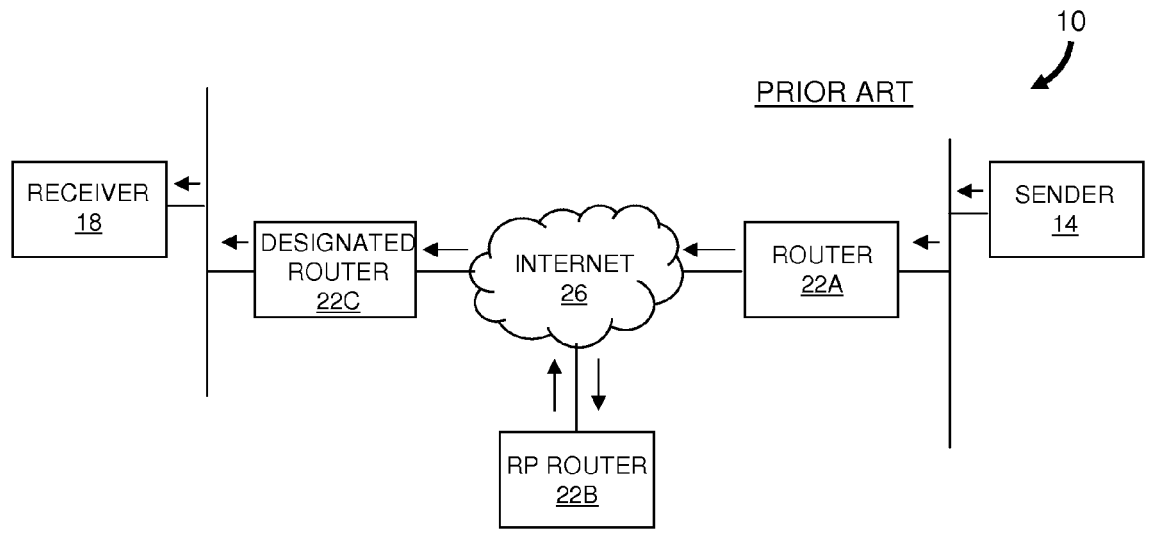
FIG. 1 is a schematic illustration of a network environment in which a multicast data flow is routed according to a shared distribution tree.
Figure 2:
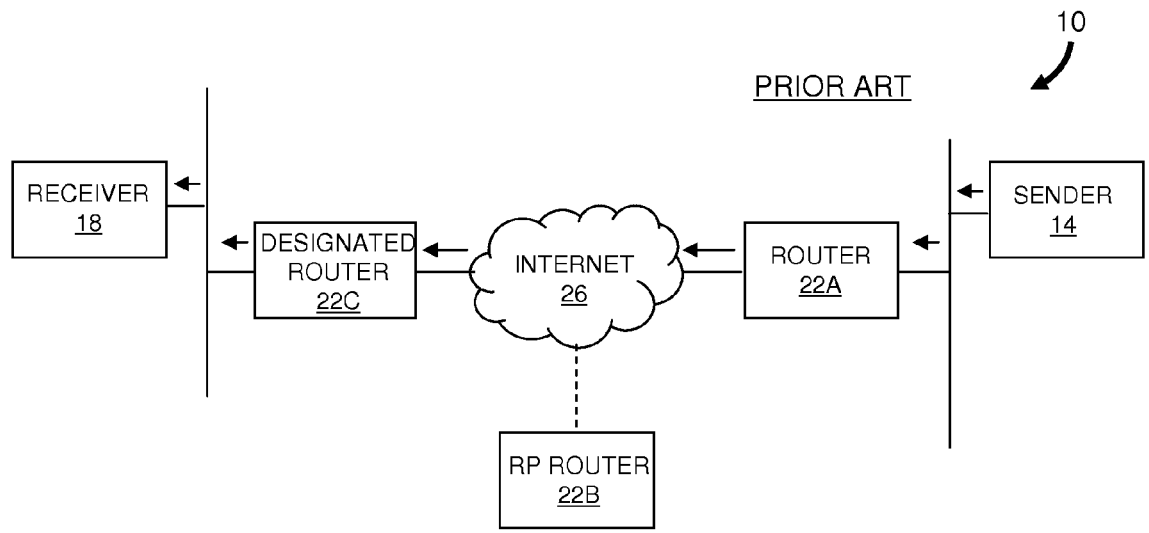
FIG. 2 is a schematic illustration of a network environment implementing a shortest path distribution tree for multicast data flow.
Figure 5:
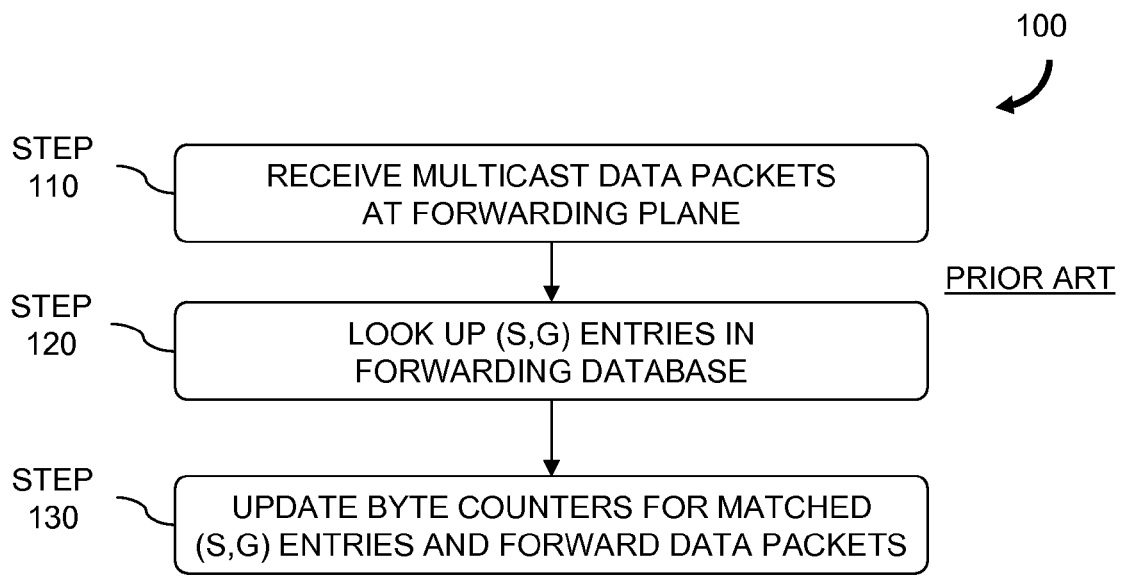
FIG. 5 is a flowchart representation of a process for updating byte counters.

FIG. 5 shows a flowchart representation of a known process 100 for updating byte counters. Referring to FIG. 1 and FIG. 5, multicast data packets are received (step 110) at the forwarding plane of the RP router 22B. The forwarding database is examined (step 120) to find the (S,G) entry for each data packet. For each data packet matched to its (S,G) entry, a corresponding packet and byte counter is incremented and the data packet is forwarded (step 130) according to the corresponding routing information.

Figure 6:
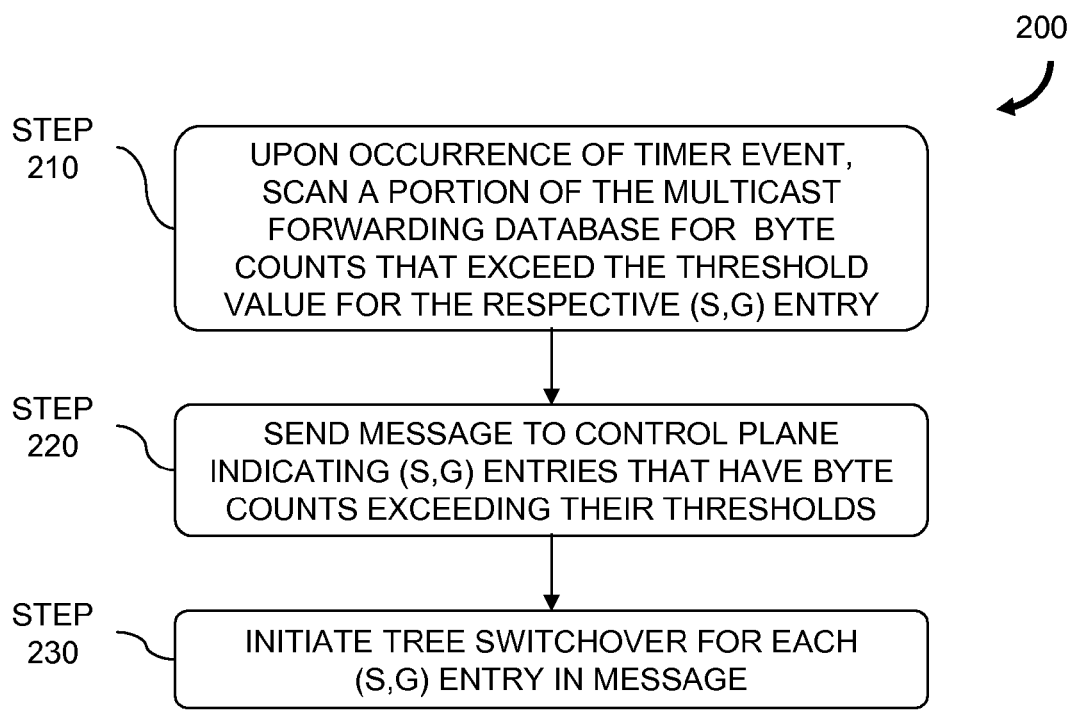
FIG. 6 is a flowchart representation of an embodiment of a method for transmitting multicast data through a network according to the invention.

FIG. 6 shows a flowchart representation of an embodiment of a method 200 for transmitting multicast data through a network according to the invention. Referring to FIG. 1 and FIG. 6, a portion of the multicast forwarding database is examined (step 210) to determine any (S,G) entries which have byte counts that exceed their threshold values. This examination is triggered by the expiration of a certain time according to a timer module in the forwarding plane of the RP router 22B. A message is then sent (step 220) to the control plane of the RP router 22B indicating the (S,G) entries that have excess byte counts. In one embodiment, the message also includes the packet count, i.e., the number of packets received and forwarded during the time interval. In response to the message, the control plane initiates (step 230) a tree switchover for each (S,G) entry indicated in the message. As described in section 2.4 of "Protocol Independent Multicast- Sparse Mode (PIM-SM): Protocol Specification," Estrin et al., RFC 2362, June 1998, incorporated herein by reference, a tree switchover can be initiated by sending a JOIN/PRUNE control message towards the sender 14. After receiving the first data packet through the shortest path tree, a JOIN/PRUNE message is sent towards the RP router 22B.

The method 200 is repeated by returning to step 210 as a subsequent portion of the multicast forwarding database is examined to determine any (S,G) entries having byte counts exceeding their threshold values. Examining portions of the database in this manner allows the method to easily scale for large numbers of (S,G) entries in the database.

While the invention has been shown and described with reference to specific embodiments, it should be understood by those skilled in the art that various changes in form and detail may be made therein without departing from the spirit and scope of the invention.

What is claimed is:

1. A method for transmitting multicast data through a network, the method comprising:
   receiving, in a forwarding plane of a router, a plurality of multicast data flows, each multicast data flow comprised of multicast data packets, each multicast data flow being routed through a shared distribution tree in a network and having a corresponding source group (S,G) entry stored in a database of the forwarding plane;
   determining, in the forwarding plane of the router, whether a byte count for each (S,G) entry exceeds a respective threshold value;
   sending an inter-process message from the forwarding plane to a control plane of the router in response to a determination that (S,G) entries have a byte count that exceeds the respective threshold value, the inter-process message indicating the (S,G) entries for the multicast data flows that are determined to have byte counts that exceed the respective threshold values, the inter-process message being a separate communication from the multicast data packets; and
   switching from the shared distribution tree to a shortest path distribution tree for each multicast data flow having a corresponding (S,G) entry that is indicated in the inter-process message.

2. The method of claim 1 wherein a byte count is determined by examining a byte counter in the forwarding plane for a timer interval.

3. The method of claim 1 wherein the threshold value is programmable.

4. The method of claim 1 wherein the corresponding (S,G) entries are a portion of all the (S,G) entries stored in the database.

5. The method of claim 1, wherein determining, in the forwarding plane of the router, whether a byte count for each (S,G) entry exceeds a respective threshold value includes examining at least a portion of (S,G) entries stored in the database of the forwarding plane prior to sending the inter-process message to the control plane.

6. The method of claim 5, wherein sending the inter-process message from the forwarding plane to the control plane includes the forwarding plane sending the inter-process message in lieu of the control plane polling the forwarding plane to determine byte counts.

7. The method of claim 6, wherein a byte count is determined by examining a byte counter in the forwarding plane for a timer interval, wherein the corresponding (S,G) entries are a portion of all the (S,G) entries stored in the database, and wherein the threshold value is programmable.

8. The method of claim 7, further comprising different respective threshold values for each of the (S,G) entries.

9. A router for routing multicast data packets through a network, comprising:
   a forwarding plane of the router, comprising:
      a multicast forwarding database storing a plurality of source group (S,G) entries each corresponding to a multicast data flow received in the forwarding plane of the router; and
      a plurality of byte counters, each byte counter determining a byte count for one of the multicast data flows corresponding to one of the (S,G)
   entries for a time interval; and
   a control plane of the router in communication with the forwarding plane, the control plane receiving an inter-process message from and initiated by the forwarding plane indicating (S,G) entries of the multicast data flows for which a corresponding byte count exceeds a respective threshold value, wherein the control plane initiates a tree distribution switchover for each multicast data flow having a corresponding (S,G) entry indicated in the inter-process message, the inter-process message being a separate communication from the multicast data packets.

10. The router of claim 9 wherein the tree distribution switchover comprises switching from a shared distribution tree to a shortest path distribution tree.

11. The router of claim 9 wherein the forwarding plane further comprises a timer module to initiate the sending of the message from the forwarding plane to the control plane upon expiration of a timer interval.

12. The router of claim 9 wherein the forwarding plane further comprises a buffer to store information indicating the (S,G) entries of the multicast data flows for which the byte count exceeds the respective threshold value.

13. The router of claim 9 wherein the message from the forwarding plane indicates a portion of the (S,G) entries stored in the multicast forwarding database for which the byte count of the multicast data flow exceeds the respective threshold value.

14. The router of claim 9, wherein the forwarding plane further comprises examining at least a portion of (S,G) entries stored in the database of the forwarding plane prior to sending the inter-process message to the control plane.

15. The router of claim 14, wherein the forwarding plane further comprises sending the inter-process message to the control plane in lieu of the control plane polling the forwarding plane to determine byte counts.

16. The router of claim 15, wherein the tree distribution switchover comprises switching from a shared distribution tree to a shortest path distribution tree.

17. The router of claim 16 wherein the forwarding plane further comprises a timer module to initiate the sending of the inter-process message from the forwarding plane to the control plane upon expiration of a timer interval.

18. The router of claim 17 wherein the forwarding plane further comprises a buffer to store information indicating the (S,G) entries of the multicast data flows for which the byte count exceeds the respective threshold value.

19. The router of claim 18 wherein the inter-process message from the forwarding plane indicates a portion of the (S,G) entries stored in the multicast forwarding database for which the byte count of the multicast data flow exceeds the respective threshold value.

* * * * *